United States Patent
Park

(10) Patent No.: US 7,584,357 B2
(45) Date of Patent: Sep. 1, 2009

(54) CONTROL DEVICE FOR CREATING ONE-TIME PASSWORD USING PRE-INPUT BUTTON CODE, HOME SERVER FOR AUTHENTICATING CONTROL DEVICE USING ONE-TIME PASSWORD, AND METHOD FOR AUTHENTICATING CONTROL DEVICE WITH ONE-TIME PASSWORD

(75) Inventor: Sung-joon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 772 days.

(21) Appl. No.: 11/332,307

(22) Filed: Jan. 17, 2006

(65) Prior Publication Data

US 2006/0174105 A1 Aug. 3, 2006

(30) Foreign Application Priority Data

Jan. 27, 2005 (KR) .................. 10-2005-0007568

(51) Int. Cl.
*H04L 9/32* (2006.01)
(52) U.S. Cl. ...................... 713/169; 380/262
(58) Field of Classification Search ............... 713/153, 713/155, 168, 169, 171; 726/4, 6; 709/203, 709/237; 380/262, 792
See application file for complete search history.

(56) References Cited

U.S. PATENT DOCUMENTS 6,275,588 B1 * 8/2001 Videcrantz et al. .......... 380/255
7,219,243 B2 * 5/2007 Lim ............................ 713/320
2003/0097584 A1 * 5/2003 Haukka et al. .............. 713/200
2004/0006713 A1 * 1/2004 Minemura ................... 713/201
2004/0078571 A1 * 4/2004 Haverinen ................... 713/168
2004/0107344 A1 * 6/2004 Minemura et al. .......... 713/171
2005/0021469 A1 * 1/2005 Han ............................ 705/51
2005/0149758 A1 * 7/2005 Park ............................ 713/201
2006/0079206 A1 * 4/2006 Kim ............................ 455/411
2006/0085635 A1 * 4/2006 Park ............................ 713/159
2006/0137005 A1 * 6/2006 Park ............................ 726/21

* cited by examiner

*Primary Examiner*—Gilberto Barron, Jr.
*Assistant Examiner*—Hadi Armouche
(74) *Attorney, Agent, or Firm*—Sughrue Mion, PLLC

(57) ABSTRACT

A control device authentication method in a home network system which includes a slave, a home server which controls the slave, and the control device which performs a remote control function to control the home server, includes registering the control device to the home server; generating and storing, by the control device and the home server, a one-way function set; storing, by the control device and the home server, a code value of a button pressed at the control device; creating, by the control device, a first password by performing an operation using a pointer value, the code value, and a one-way function number; requesting, by the control device, authentication by transferring the pointer value, the one-way function number, and the first password to the home server; and creating, by the home server, a second password.

16 Claims, 10 Drawing Sheets

CONTROL DEVICE FOR CREATING ONE-TIME PASSWORD USING PRE-INPUT BUTTON CODE, HOME SERVER FOR AUTHENTICATING CONTROL DEVICE USING ONE-TIME PASSWORD, AND METHOD FOR AUTHENTICATING CONTROL DEVICE WITH ONE-TIME PASSWORD

CROSS-REFERENCE TO RELATED APPLICATIONS

This application claims priority from Korean Patent Application No. 2005-7568 filed on Jan. 27, 2005, in the Korean Intellectual Property Office, the entire disclosure of which is incorporated herein by reference.

BACKGROUND OF THE INVENTION

1. Field of the Invention

Control devices, home network systems controlled by the control devices, and methods consistent with the present invention relate to creating a one-time password, and authenticating a control device with the one-time password. More particularly, exemplary embodiments of the present invention relate to a control device which creates a one-time password using a button code input during a remote control function procedure of the control device and a home network system which uses the created one-time password, a one-time password creation method, and a method for authenticating the control device with the one-time password.

2. Description of the Related Art

With the advancement of electronics and telecommunications technologies, research has been actively conducted on a home network system which networks and integrally controls various home appliances. The home network system consists of at least one slave and a home server for controlling the slave. A user can access the home server via a control device and can control the whole home network system whether the user is indoors or outdoors. The control device can be a mobile phone, a personal digital assistant (PDA), and a notebook computer, which are portable by users.

The home network system is under development for a user's convenience, but home network systems are vulnerable to third party interference. To prevent this, the user needs to input his or her identification (ID) and password to certify that the user is an authorized user. However, since the ID and the password input by the user are transferred to the home server in the form of wireless packets, a third party may steal the password using password sniffing. In this situation, the security system of the home network system becomes meaningless. Thus, security maintenance technology has been introduced to prevent such a problem. For example, a one-time password (OTP) can be used.

The OTP scheme frequently changes the password which is delivered between the control device and the home server. Specifically, even when the user inputs the same password, a different password is always transferred. Accordingly, security can be assured against password sniffing by the third party.

Conventional OTP implementation methods take advantage of a time synchronous scheme and a one-way hash function scheme. The time synchronous scheme constantly changes the password using a random number generated from a token device and a personal identification number (PIN) input by the user. However, disadvantageously, the time synchronous scheme requires a separate token device and time synchronization with the server.

The one-way hash function scheme creates a password using a hash function which transforms an input data string to a hash code of a fixed-length output. The hash function is a function that satisfies two properties: 1) it is infeasible to find a data string that creates the same hash code as the given hash code; and 2) it is impossible to find another data string that produces the same hash code with respect to the given data string.

As the one-way hash function scheme reduces the number of hash functions by one for each certification, the hash function should be initiated at a specific time. However, the home network system is subject to the frequent access of the user according to its system characteristics. Thus, it is not easy to apply the one-way hash function scheme.

In view of the above, the conventional OTP methods are insufficient for a home network system.

SUMMARY OF THE INVENTION

The present invention addresses the above-mentioned and other problems and disadvantages occurring in the conventional arrangement. An aspect of an exemplary embodiment of the present invention is to provide a control device for creating a one-time password using a button code, which is input during a remote control function execution when the control device controlling a home network system is equipped with the remote control function, and a one-way function maintaining security using the one-time password, without time synchronization, a separate token device, and arbitrary initialization, and a method for creating the one-time password.

Another aspect of an exemplary embodiment of the present invention provides a home server which authenticates a control device by creating and using a one-time password using a button code input from a control device and a one-way function, and a method for certifying the control device.

To accomplish the above aspects of the exemplary embodiment of the present invention, a control device authentication method in a home network system which includes a slave, a home server for controlling the slave, and the control device for performing a remote control function to control the home server, includes registering the control device to the home server; generating and storing, by the control device and the home server, a one-way function set having parameters which are a user ID of the control device, and an authentication key assigned to the control device; storing, by the control device and the home server, a code value of a button pressed at the control device for performing the remote control function; creating, by the control device, a first password by performing an operation using a pointer value which indicates an area storing a first code value in a memory provided in the control device, the first code value, and a one-way function of a certain number among the one-way function set; requesting, by the control device, the authentication by transferring the pointer value, the one-way function number, and the first password to the home server; creating, by the home server, a second password by performing an operation using a code value stored in an area indicated by the pointer value in a first server memory provided in the control device, the pointer value, and a one-way function corresponding to the one-way function number; and completing, by the home server, the authentication of the control device when a determination is made that the first password and the second password match.

The registering of the control device may include transferring, by the control device, a register request packet to the home server; generating and displaying, by the home server, an authentication key; transferring, by the control device, byte values of the authentication key to the home server when a user of the control device inputs the authentication key; generating, by the control device and the home server, the user ID by converting the authentication key; and storing, by the control device and the home server, the generated user ID and the authentication key.

The registering of the control device may include transferring, by the control device, a register request packet to the home server; generating and transferring, by the home server, an Authentication key to the control device; transferring, by the control device, byte values of the authentication key to the home server when a user of the control device inputs the authentication key; generating, by the control device and the home server, the user ID by converting the authentication key; and storing, by the control device and the home server, the generated user ID and the authentication key.

The storing of the code value may include performing, by the control device, an operation using the code value, the pointer value which indicates the area to store the code value in the memory, and the authentication key, and transferring the operation result to the home server; checking, by the home server, the code value using the received operation result and the authentication key, and transferring a reply packet; determining, by the control device, a normal reception of the code value at the home server when the reply packet is received, and storing the code value in the memory area; and storing, by the home server, the checked code value in an area of the first server memory.

The storing of the code value may include performing, by the control device, a first operation using a first value of the authentication key and the code value, and transferring a first operation result to the home server; performing, by the home server, a second operation using a code value confirmed by the first operation result and a second value of the authentication key, and transferring a second operation result to the control device; authenticating the code value after the control device checks the code value from the second operation result using the second value of the authentication key; performing, by the control device, a third operation using the authenticated code value and a third value of the authentication key, and transferring a third operation result to the home server; checking, authenticating, and storing, by the home server, the code value from the third operation result using the third value of the authentication key; performing, by the home server, a fourth operation using the authenticated code value and a fourth value of the authentication key, and transferring a fourth operation result to the control device; and checking, by the control device, the fourth operation result using the fourth value of the authentication key, completing the authentication, and storing the code value.

The storing of the code value may further include synchronizing, by the home server and the control device, the pointer value of the memory and the pointer value of the first server memory; and storing, by the home server, the checked code value in the first server memory area which is indicated by the pointer value received from the control device.

A control device for controlling a home network which includes more than one slave and a home server for controlling the slave, includes an interface which transmits and receives data to and from the home server; a key input section which is provided with buttons for controlling the home server and outputs a code value corresponding to a selected button; a code value authenticator which transfers to the home server and authenticates the code value which is output from the key input section; a first memory which stores the code value authenticated by the code value authenticator in an area; a second memory which stores a one-way function set; a password creator which creates a one-time password using a pointer value indicating an area storing a first code value in the first memory, the first code value, and a one-way function selected from the one-way function set; and a controller which generates a packet containing the pointer value, a one-way function number, and the one-time password, and requests the authentication by transferring the generated packet to the home server via the interface.

The controller, when an authentication key is input through the key input section, may generate a user ID by converting the authentication key and store the authentication key and the user ID in the second memory.

The controller may transmit byte values of the authentication key input through the key input section, to the home server via the interface so that the home server converts the authentication key to the user ID and registers the user ID.

The controller may generate a one-way function set including a plurality of one-way functions and store the one-way function set in the second memory when the registration is completed.

The code value authenticator may perform an operation with the code value and the authentication key, transmit the operation result to the home server via the interface, and authenticate the code value when a code value, which is recorded in a reply packet received from the home server, matches the code value.

A home server for controlling, a slave under control of a control device in a home network system which includes the control device and more than one slave, includes a server interface which receives from the control device a pointer value indicating a memory area, a one-way function number, and a first password; a first server memory which stores a code value corresponding to a button input at the control device; a second server memory which stores a one-way function set; a calculator which calculates a second password using a code value stored in an area indicated by the pointer value in the first server memory, the pointer value, and a one-way function which corresponds to the one-way function number in the one-way function set; and a home server controller which authenticates the control device when the first password and the second password match.

The home server controller may synchronize a pointer value received from the control device and a pointer value of the first server memory.

The home server may further include a display section which displays data. The home server controller may generate an authentication key for the control device when a register request packet is received from the control device, and control the display section to display the authentication key.

The home server controller, when the authentication key is received from the control device, may generate a user ID by converting the received authentication key, generate the one-way function set having parameters which are the user ID and the authentication key, and store the user ID, the authentication key, and the one-way function set in the second server memory.

The home server may further include an authenticator which authenticates a code value received from the control device, using the authentication key. The home server controller may store the code value authenticated by the authenticator in the first server memory.

BRIEF DESCRIPTION OF THE DRAWINGS

These and/or other aspects of the invention will become apparent and more readily appreciated from the following description of exemplary embodiments, taken in conjunction with the accompanying drawings of which.

DETAILED DESCRIPTION OF THE EXEMPLARY EMBODIMENTS

Figure 1:
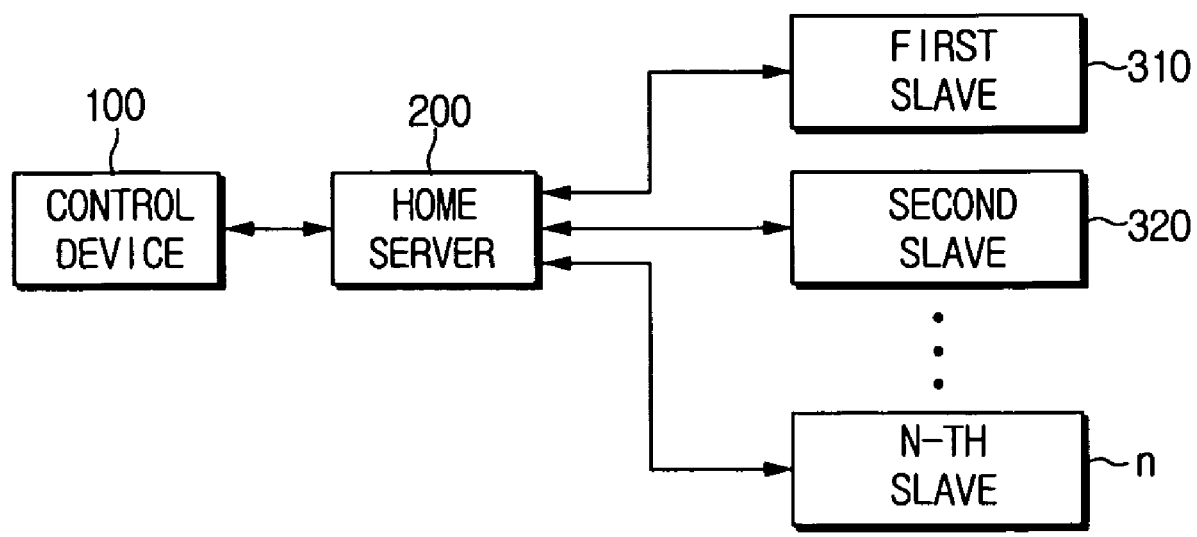
FIG. 1 is a block diagram of a home network system according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

FIG. 1 is a block diagram of a home network system according to an exemplary embodiment of the present invention. Referring first to FIG. 1, the home network system includes a control device 100, a home server 200, and a plurality of slaves 310, 320, . . . , n.

The first through N-th slaves 310 through n can be various devices such as personal computers (PC's), digital versatile disk (DVD) players, televisions, boilers, air conditioners, electric lights, refrigerators, and heaters. The home server 200 transfers and receives data to and from a node which resides outside of the home server 200. The home server 200 can be for example, a separate server or a home appliance. In an exemplary embodiment, the home server 200 is a television.

The control device 100 is a device equipped with a communication function for accessing the home server 200 from outside of the home server 200. Particularly, the control device 100 is equipped with a remote control function for directly controlling the operation of home appliances in the home network system. The control device 100 stores button code values, which are input during the remote control function execution, to registers in its memory in sequence. The control device 100 transfers the code values to the home server 200 to share the code values with the home server 200. In an exemplary embodiment, during the transfer of the code values, the code values are encrypted using a certain key to prevent leakage of the code values.

The control device 100 should be authenticated to access the home server 200. To this end, the control device 100 is registered to the home server 200 in advance. Upon the registration, the control device 100 and the home server 200 create a one-way function set which has parameters including a user ID, an authentication key, and a custom code. The custom code is a unique code assigned by a manufacturer of the home server 200, and will be explained later.

The control device 100 creates a one-time password (hereinafter referred to as a "first password") by executing the operation using the pre-input button code value and a one-way function of the one-way function set.

The home server 200 creates a one-time password (hereinafter referred to as a "second password") using the code value received from the control device 100 and the one-way function. Accordingly, when the first password and the second password match, the control device 100 can be authenticated. The first and second passwords constantly change for each authentication because one of the code value and the one-way function sequentially changes. Additionally, every time the user presses a button provided on the control device 100, the values stored in the registers in the memory also change. Thus, a different password can be created constantly without separate initialization.

Figure 2:
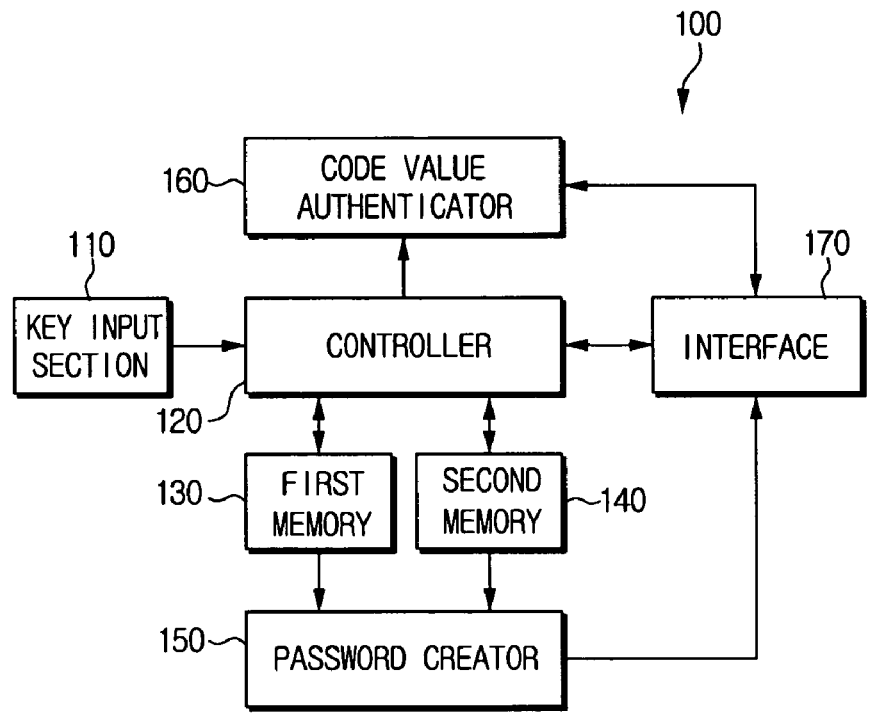
FIG. 2 is a block diagram of a control device according to an exemplary embodiment of the present invention.

FIG. 2 is a block diagram of the control device 100 according to an exemplary embodiment of the present invention. Referring to FIG. 2, the control device 100 includes a key input section 110, a controller 120, a first memory 130, a second memory 140, a password creator 150, a code value authenticator 160, and an interface 170.

In the key input section 110, when a button provided on the body of the control device 100 is pressed, a code value corresponding to the pressed button is output to the controller 120.

The controller 120 stores the code value input from the key input section 110 to a certain region of the first memory 130. In an exemplary embodiment, the controller 120 stores only a code value authenticated from the home server 200 to the first memory 130.

Upon registration of the control device 100 to the home server 200, the controller 120 generates a one-way function set which includes a plurality of one-way function chains with parameters such as a user ID, an authentication key, and a custom code. The second memory 140 stores the generated one-way function set. The registration of the control device 100 to the home server 200 and the user ID creation will be described later in more detail.

The password creator 150 selects the one-way functions, in sequence, in the one-way function set. The first password is created by executing the one-way function operation by using the code value stored in the first memory 130, a pointer value indicating an address of the first memory 130 storing the code value, and the selected one-way function.

The code value authenticator 160 is responsible for authenticating the code value input through the key input section 110 for the home server 200. Specifically, the code value authenticator 160 conducts an operation with bits and code values of the authentication key being registered, and transmits the operation result to the home server 200. The data transmission and reception with the home server 200 is performed through the interface 170. The home server 200 checks the code value from the received operation result and responds with a reply packet. The code value authenticator 160 checks the code value contained in the reply packet and completes the authentication when the same code value is received. Similarly, the home server 200 can conduct an operation with the confirmed code values and bits of the authentication key, and transmit a reply packet containing the operation result to the control device 100. The code value authentication can be carried out several times depending on the bit length of the authentication key, which will be explained later.

When the first password is created by the password creator 150, the controller 120 generates a packet which contains a one-way function number indicating the one-way function used for the creation of the first password, the pointer value used in the first password creation, and the first password. The generated packet is transferred to the home server 200 via the interface 170 in order to request authentication.

Figure 3:
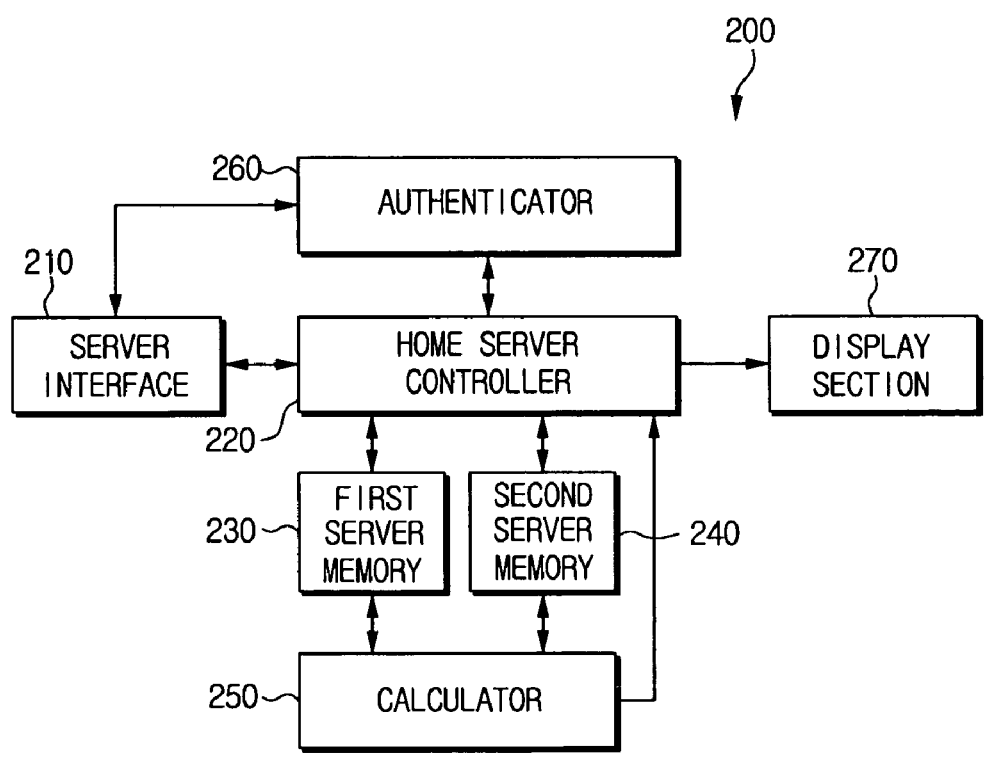
FIG. 3 is a block diagram of a home server according to an exemplary embodiment of the present invention.

FIG. 3 is a block diagram of the home server 200 according to an exemplary embodiment of the present invention. Referring to FIG. 3, the home server 200 includes a server interface 210, a home server controller 220, a first server memory 230, a second server memory 240, a calculator 250, an authenticator 260, and a display section 270.

The server interface 210 serves to transmit and receive data to and from the control device 100.

The authenticator 260 authenticates the code value input through the server interface 210. In more detail, upon receiving the code value and the operation result of the authentication key from the control device 100, the authenticator 260 acquires the code value from the operation result by use of the authentication key. Next, the authenticator 260 generates a reply packet by conducting an operation with the acquired code value and the authentication key. In an exemplary embodiment, the code value authenticator 160 of the control device 100 and the authenticator 260 of the home server 200 calculate the code value and the authentication key through the exclusive OR operation.

The authentication key is assigned by the home server controller 220 in the registration procedure of the control device 100. When a register request packet is received from the control device 100, the home server controller 220 creates and displays the authentication key onto the display section 270. The user of the control device 100 perceives the displayed authentication key and inputs his or her authentication key through the control device 100. The control device 100 creates a user ID by automatically converting the input authentication key. The created user ID and the authentication key are stored in the second server memory 240. Note that the home server controller 220 may transfer the generated authentication key directly to the control device 100.

The first server memory 230 stores only the code value authenticated by the authenticator 260. At this time, the home server controller 220 synchronizes the pointer value of the first server memory 230 based on the pointer value recorded in the packet received from the control device 100. For the synchronization, the home server controller 220 checks the pointer value received from the control device 100. When the received pointer value is greater than the current pointer value of the first server memory 230, the home server controller 220 adjusts the current pointer value to the received pointer value and notifies the control device 100 of the current pointer value. Conversely, when the received pointer value is smaller than the current pointer value of the first server memory 230, the home server controller 220 adjusts the current pointer value to the received pointer value and notifies the control device 100 of the adjusted pointer value. The control device 100 confirms the pointer value received from the home server controller 220 and transmits the adjusted pointer value to the home server 200. Therefore, both the control device 100 and the home server 200 can confirm the synchronization of the pointer value.

Upon registering the control device 100, the home server controller 220 generates a one-way function set having parameters such as a user ID, an authentication key, and a custom code. The generated one-way function set is stored in the second server memory 240.

Upon reception of the pointer value, the one-way function number, and the first password, the calculator 250 reads out the code value from the first server memory 230 using the received pointer value. The calculator 250 selects the one-way function corresponding to the received one-way function number, from the one-way function set stored in the second server memory 240. Hence, the calculator 250 creates the second password by conducting the one-way function operation with the read code value, the pointer value, and the one-way function.

The home server controller 220 compares whether the second password obtained at the calculator 250 and the first password received from the control device 100 match. When the two passwords match, the authentication on the control device 100 is completed.

Figure 4:
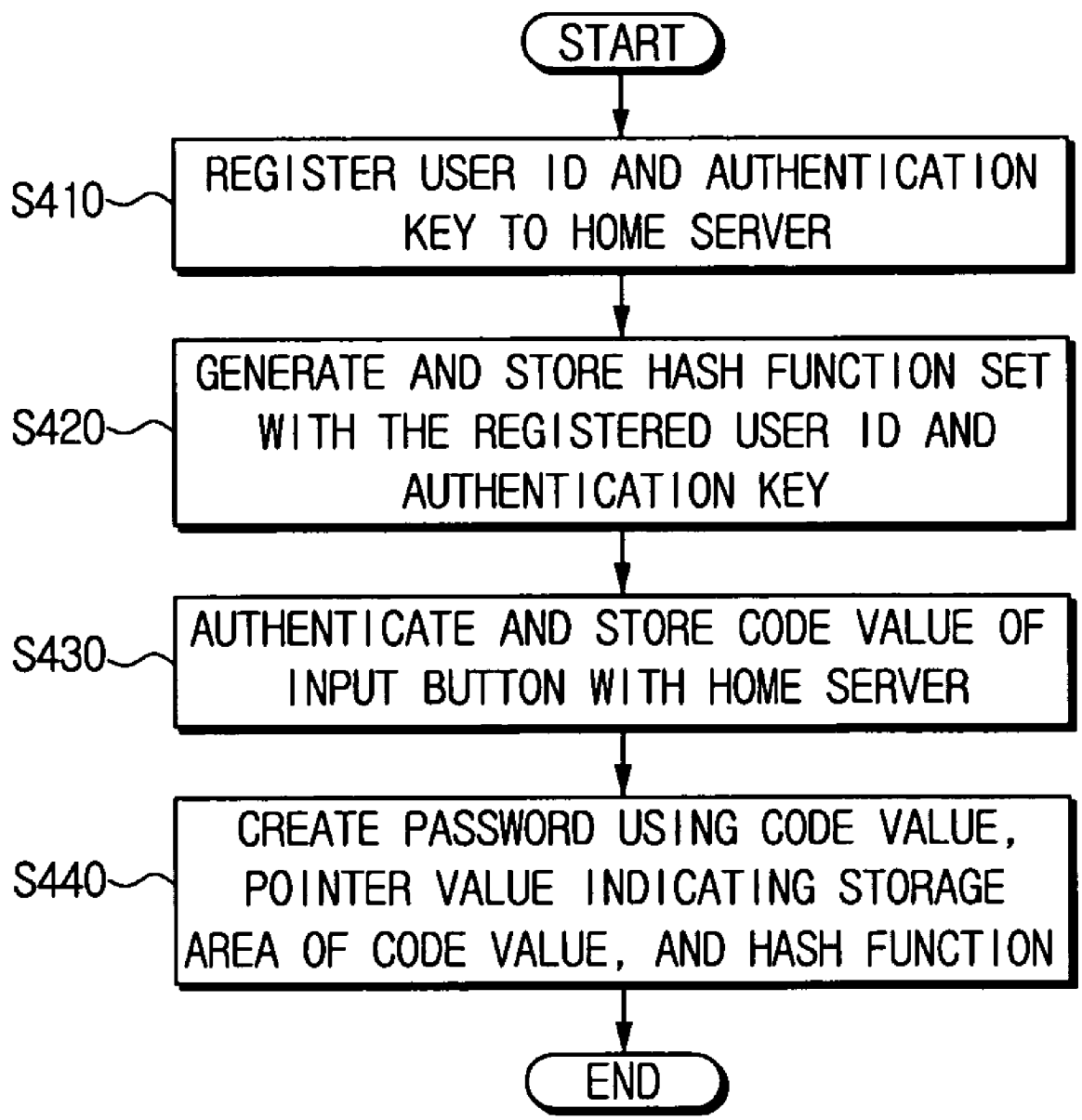
FIG. 4 is a flowchart outlining a one-time password creation method according to an exemplary embodiment of the present invention.

FIG. 4 is a flowchart outlining a one-time password creation method of the control device 100 according to an exemplary embodiment of the present invention. Referring to FIG. 4, the control device 100 registers the user ID and the authentication key assigned from the home server 200 (S410). The registration of the authentication key will be described later in detail.

Each of the control device 100 and the home server 200 generates and stores the one-way function set having input parameters that are the registered user ID, the registered authentication key, and the custom code (S420).

When the user conducts the remote control function or presses a button of the control device 100 for another purpose, the code value of the selected button is authenticated between the control device 100 and the home server 200 and the authenticated code value is stored (S430). The authentication will be set forth in detail below.

At this time, if the user of the control device 100 attempts to access the home server 200 to remotely control the home network system, then authentication should be requested.

For this, the control device 100 creates the first password by the one-way operation with the code value, the pointer value indicating the storage area of the code value in the first memory 130, and a one-way function (S440). The created first password is used for the authentication from the home server 200.

Figure 5:
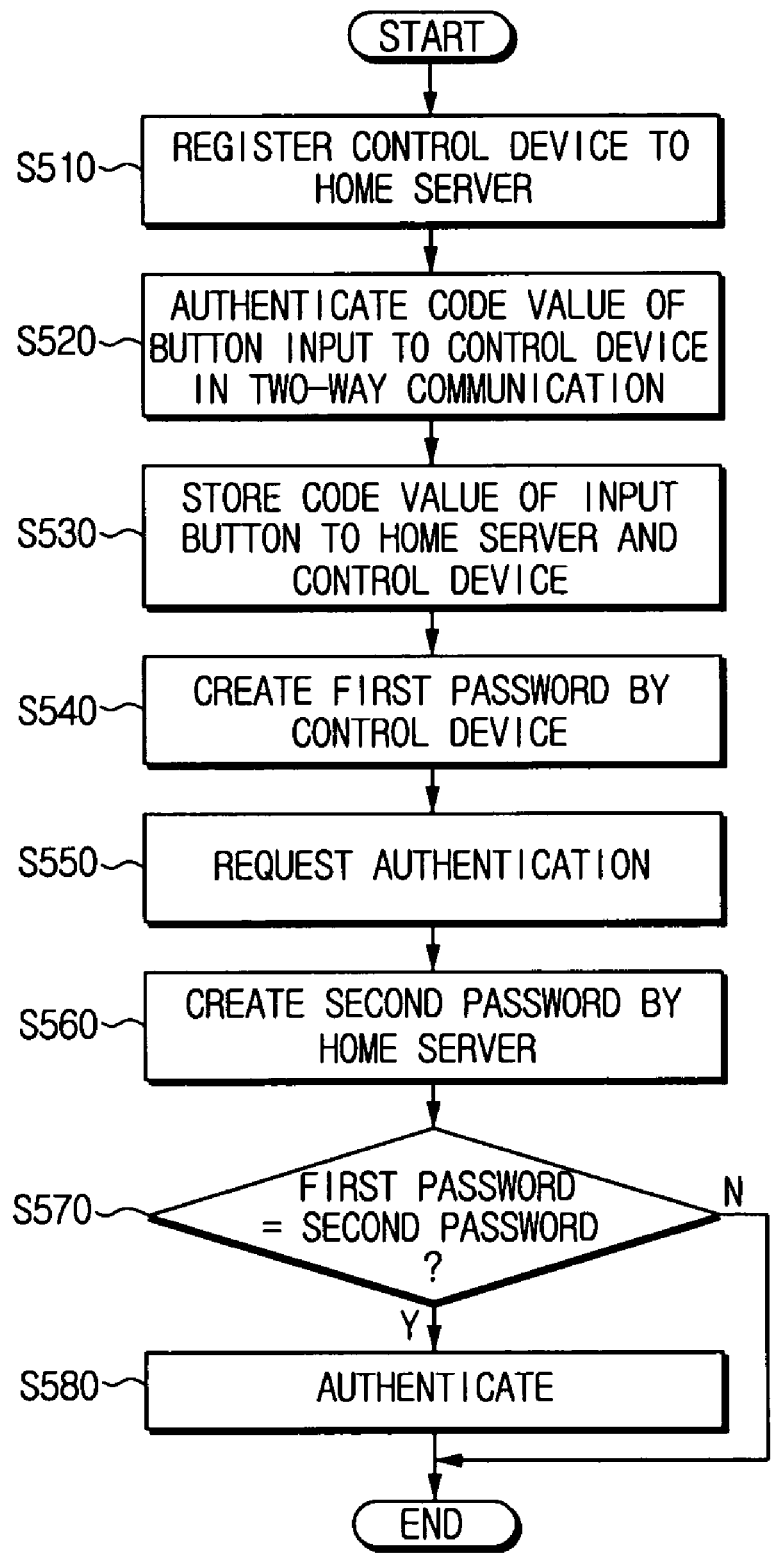
FIG. 5 is a flowchart outlining an authentication method of the control device according to an exemplary embodiment of the present invention.

FIG. 5 is a flowchart outlining an authentication method of the control device 100 in the home network system according to an exemplary embodiment of the present invention. Referring to FIG. 5, when the control device 100 is registered (S510), the code value of the button input to the control device 100 is authenticated through a two-way communication (S520). The authenticated code value is stored to the control device 100 and the home server 200, respectively (S530).

Next, the control device 100 creates the first password using the code value, the pointer value indicating the storage area of the code value, and the one-way function (S540). The authentication is requested by transferring the pointer value, the one-way function number, and the first password to the home server 200 (S550).

The home server 200 checks the received pointer value and reads out the code value from the first server memory 230. Also, the home server 200 checks the one-way function number and selects a one-way function in the generated one-way function set. Next, the second password is created using the code value, the pointer value, and the one-way function (S560).

The home server 200 compares whether the created second password and the received first password match (S570). When the two passwords match, the home server 200 authenticates the control device 100 (S580). Upon the authentication, the control device 100 transmits a control signal to the home server 200 according to a protocol and thus controls the home network system.

Figure 6:
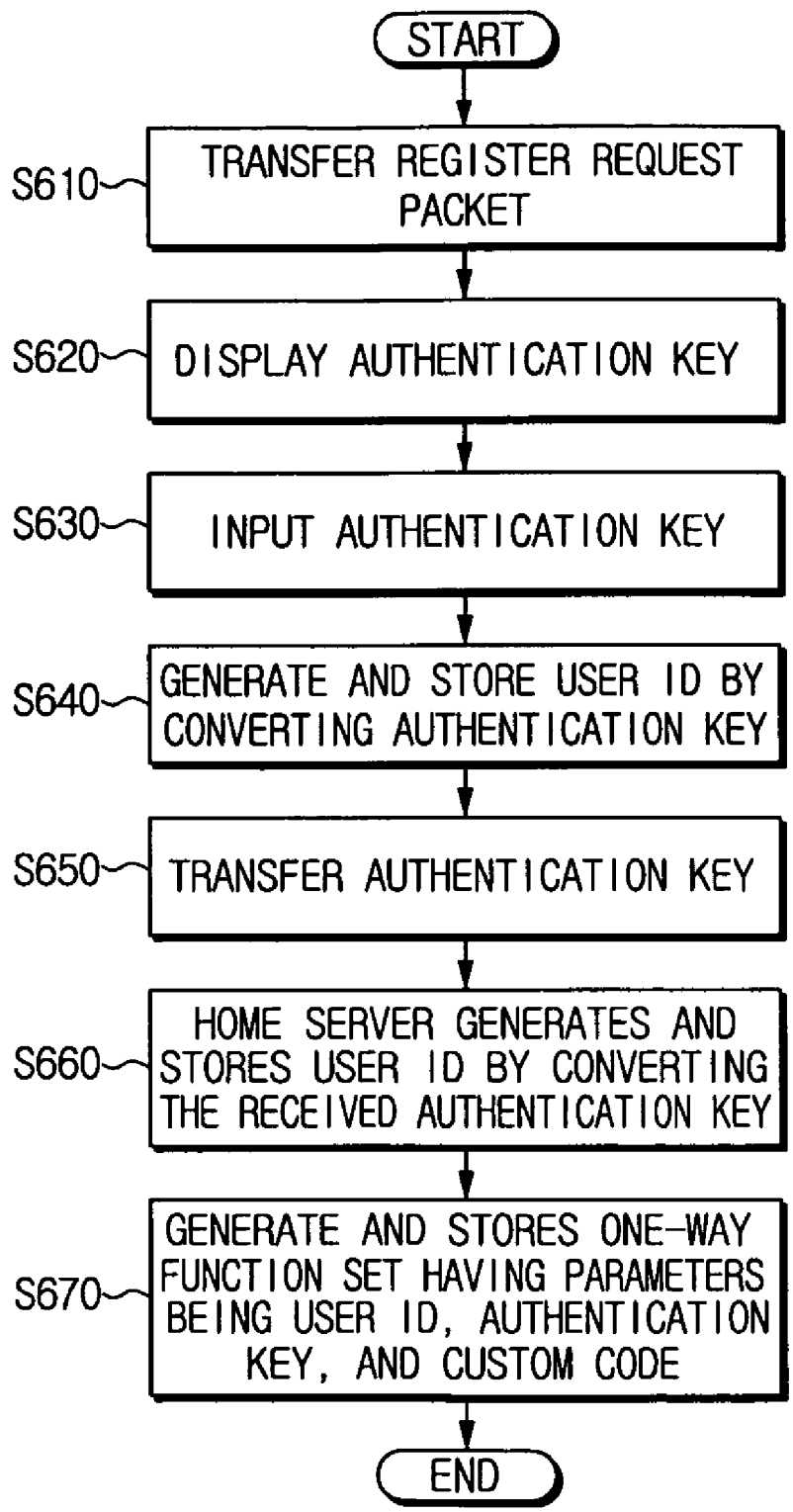
FIG. 6 is a flowchart outlining a method for registering the control device to the home server according to an exemplary embodiment of the present invention.

FIG. 6 is a flowchart outlining a method for registering the control device 100 according to an exemplary embodiment of the present invention. Referring to FIG. 6, when the control device 100 transfers a register request packet (S610), the home server 200 generates and displays an authentication key onto the display section 270 (S620). At this time, if the control device is provided with a display element, the home server 200 may transfer the authentication key to the control device 100. Meanwhile, due to the risk of wiretapping by a third party, in an exemplary embodiment, the authentication key is confirmed directly on the display section 270.

The user of the control device 100 inputs the displayed authentication key (S630). The control device 100 generates and stores a user ID by automatically converting the authentication key (S640). The user ID can be generated through the bitwise exclusive OR operation with respect to the authentication key. More specifically, for a four-byte authentication key, the XOR operation is performed on the first and second bytes, and the XOR operation is performed on the third and fourth bytes. Next, the one-byte operation result can be obtained by performing the XOR operation to the two operation results. The finally obtained operation result is the user ID.

It is then required to check whether the authentication key input from the user of the control device 100 is authorized. To this end, the control device 100 transfers the byte value of the input authentication key to the home server 200 (S650).

When the assigned authentication key and the received authentication key match, the home server 200 generates and stores the user ID by converting the authentication key (S660).

Next, the control device 100 and the home server 200 generates the one-way function set having the parameters that are the user ID, the authentication key, and the custom code, and stores the one-way function set to the second memory 140 and the second server memory 240, respectively (S670). The generated one-way function set is used together with the code value and the pointer value for the password creation.

Figure 7:
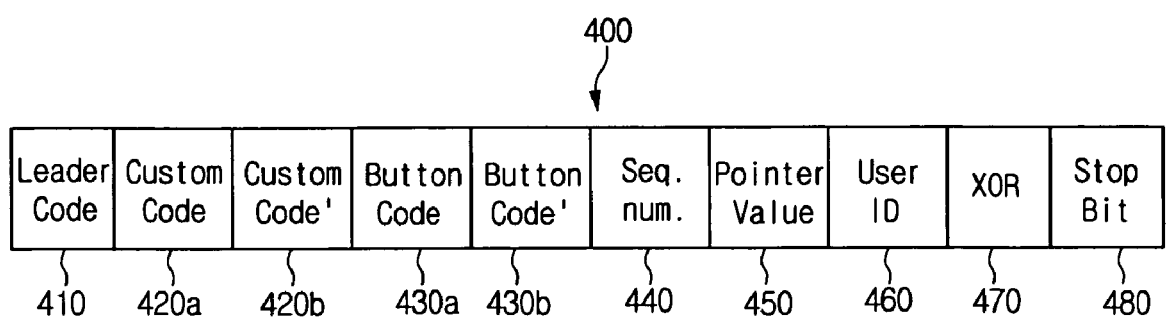
FIG. 7 is a conceptual diagram of a data format which is transferred from the control device to the home server for the one-time password creation.

FIG. 7 is a conceptual diagram of a format of a message which is transferred from the control device 100 to the home server 200. Referring to FIG. 7, the message 400 includes a leader code 410, a custom codes 420a and 420b, button codes 430a and 430b, a sequence number 440, a pointer value 450, a user ID 460, an XOR area 470, and a stop bit 480.

The leader code 410 corresponds to a packet header, where a destination address and a source address are recorded. The custom codes 420a and 420b are areas where a unique code assigned from a manufacturer of the home server 200 is recorded. The button codes 430a and 430b are where the code value of the button selected on the control device 100 is recorded. In an exemplary embodiment, the custom codes 420a and 420b and the button codes 430a and 430b respectively are divided into two areas for the sake of information validity, and the same data are duplicated and recorded in the divided areas.

The sequence number 440 is an area for recording that the current received message is a n-th message. The pointer value 450 is an area to record the address of the memory area storing the corresponding code value. The user ID 460 is an area to record the registered user ID. Prior to the registration, a null value is recorded in the user ID 460. The XOR area 470 is to record the XOR operation result of the sequence number 440, the pointer value 450, and the user ID 460. By checking the value recorded in the XOR area 470, it is possible to determine whether the sequence number 440, the pointer value 450, and the user ID 460 are error values. The stop bit 480 is an area which indicates the end of the message.

Figure 8:
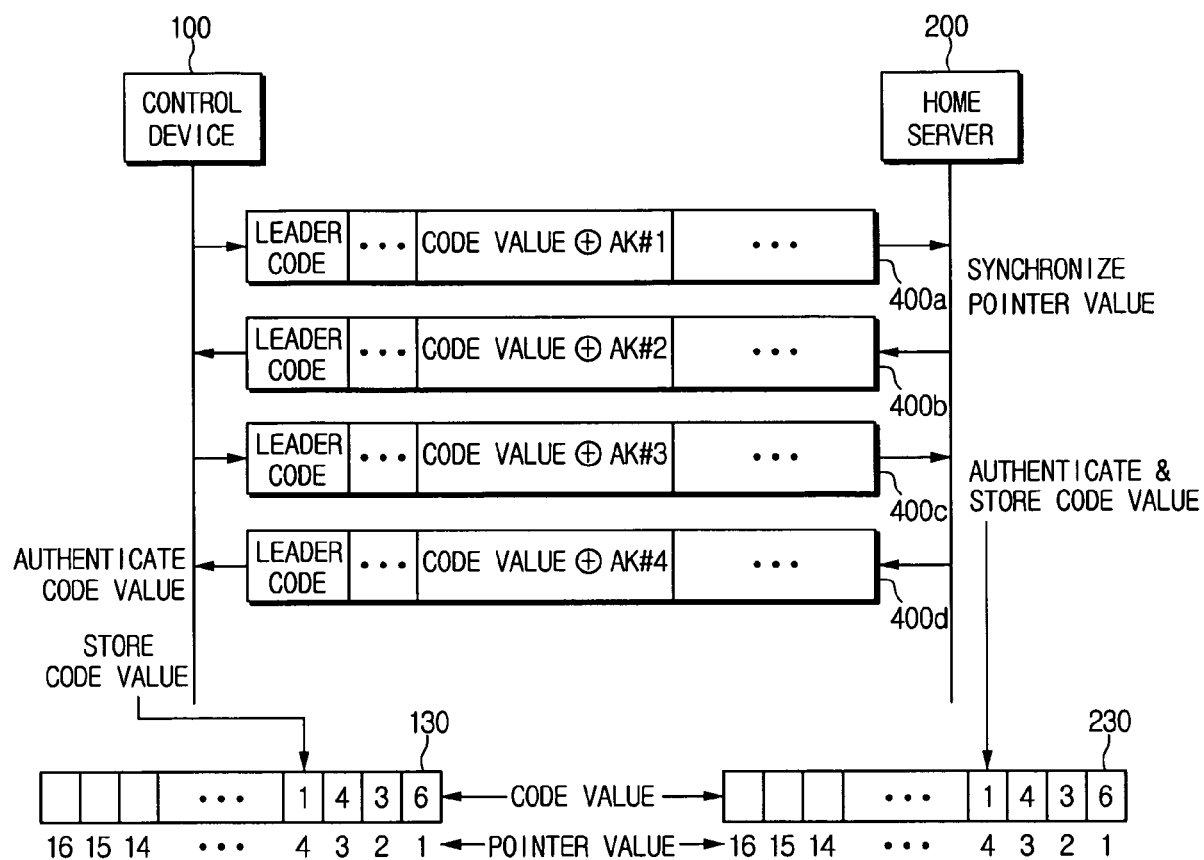
FIG. 8 is a conceptual diagram explaining a code value authentication operation between the control device and the home server.

FIG. 8 is a conceptual diagram Explaining a code value authentication operation by transferring the message 400 constructed as shown in FIG. 7. In FIG. 8, it is exemplified that the authentication key consists of four bytes and the code value consists of 1 byte.

Referring to FIG. 8, when a button is pressed, the control device 100 performs the XOR operation to the first value AK#1 of the code value of the pressed button and the authentication key AK. As shown in FIG. 8, the XOR operation is represented by "$\oplus$". Next, the operation result is recorded in the button codes 430a and 430b to generate a first message 400a. The first message 400a is transferred to the home server 200. The home server 200 confirms the user ID of the received first message 400a and reads out the corresponding authentication key from the second server memory 240. The code value recorded in the button codes 430a and 430b are checked using the first value AK#1 of the authentication key. The home server 200 synchronizes the pointer value in the first server memory 230 using the pointer value 450 recorded in the first message 400a.

Next, the home server 200 performs the XOR operation with the checked code value and the second value AK#2 of the authentication key. The operation result is recorded in the button codes 430a and 430b and thus a second message 400b is generated. The second message 400b is transferred to the control device 100. At this time, in case the pointer value of the first server memory 230 is adjusted, the adjusted pointer value is also recorded in the second message 400b and the control device 100 is informed of the adjusted pointer value.

The control device 100 checks the code value recorded in the second message 400b using the second value AK#2 of the authentication key. When the checked code value matches the code value delivered by the first message 400a, the successful delivery of the code value can be confirmed. Meanwhile, wireless communications are conducted between the control device 100 and the home server 200. Thus, for more accurate code value authentication, the authentication operation may be carried out several more times using the rest of the values of the authentication key.

In further detail, the control device 100 generates a third message 400c using the code value and the third value AK#3 of the authentication key and transfers the third message 400c to the home server 200. The home server 200 checks the third message 400c, generates a fourth message 400d with the fourth value AK#4 of the authentication key, and transfers the fourth message 400d to the control device 100. As such, when the code values are identical until the last value of the authentication key is used, the code value authentication is completed.

The control device 100 records the code values in the respective registers of the first memory 130 in sequence. Referring back to FIG. 8, after a button "1" is pressed and authenticated, a code value "1" is stored in the fourth register of the first memory 130, that is, in the area specified by the pointer value "4". If a double-FIGURE button is pressed, two code values are stored in the first memory 130. The home server 200 also records the code values to the registers of, the first server memory 230 in sequence. At this time, as the synchronization is attained, the code value "1" is stored in the area of the first server memory 230 as specified by the pointer value "4".

Figure 9:
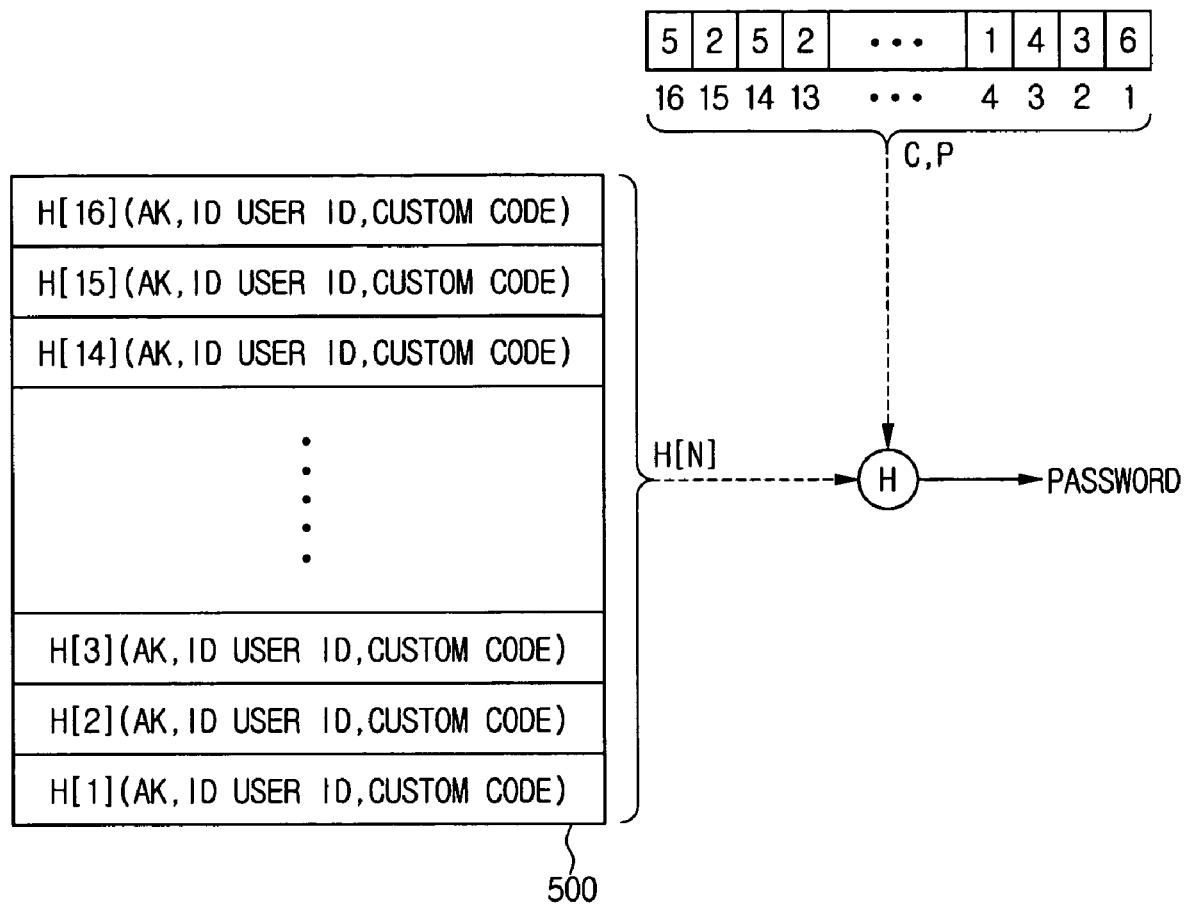
FIG. 9 is a conceptual diagram explaining a one-time password creation operation using a pointer value, a code value and a one-way function value.

FIG. 9 is a conceptual diagram explaining a one-time password creation operation at the control device 100 and the home server 200. Referring to FIG. 9, the password is created using the first memory 130 and the first server memory 230 which store the code values and the one-way function set 500. The code value C and the pointer value P are read out from the first memory 130 and the first server memory 230. The one-way function of a certain number N is obtained from the one-way function set 500. The one-time password is created by performing the operation with the obtained one-way function. The one-way function set 500, as shown in FIG. 9, may be generated using parameters such as a user ID, an authentication key, and a custom code.

It is noted that a hash function is used as the one-way function in FIG. 9. The first memory 130 and the first server memory 230 each have 16 pointer values, and the hash function set consists of 16 hash functions. Accordingly, the password is created by sequentially selecting the pointer values in the first memory 130 and the first server memory 230, and the hash functions in the hash function set. As a result, different passwords can be produced for 256 (=16*16) times. For instance, the initial password is created using the pointer value "1", the code value "6", and the hash function H[16], and then the hash function is changed in the order of H[15], H[14], .... After the hash functions up to H[1] are applied, the pointer value and the code values are changed to "2" and "3", respectively. Next, the hash function operation is conducted in the order of H[16], H[15], H[14], ...

In this state, when a button of the control device 100 is pressed, the code value is changed again. As such, owing to the frequent changes of the code value, a separate initialization process is not required during the 256 times of the password creation.

Figure 10:
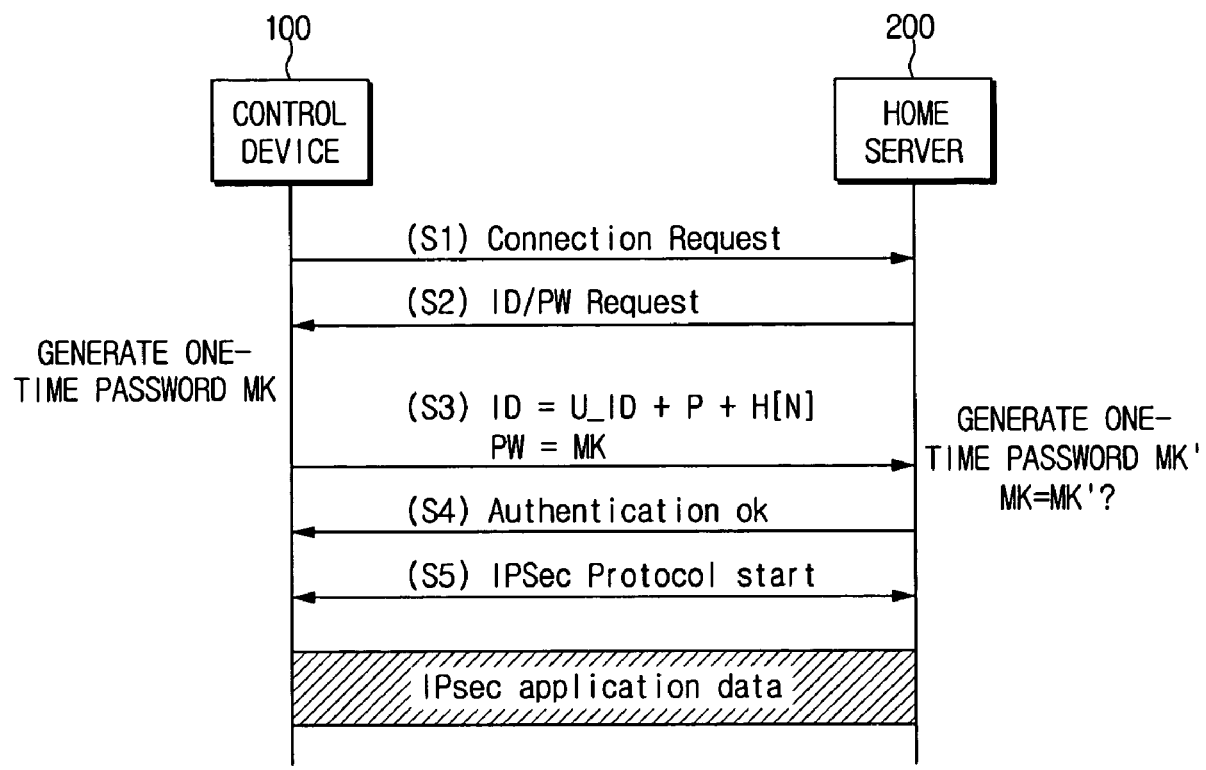
FIGS. 10 and 11 are conceptual diagrams explaining a communication operation based on the control device authentication method.

FIG. 10 is a conceptual diagram explaining a communication scheme based on the control device authentication method according to an exemplary embodiment of the present invention. Referring to FIG. 10, the control device 100 requests a connection to the home server 200 (S1). The home server 200 then requests the ID and the password required for the authentication (S2) from the control device 100. The control device 100 creates an ID by accumulating the pre-registered user ID, the pointer value P, and the one-way function number H[N]. The control device 100 also creates a one-time password MK as discussed with respect to FIG. 9. Next, the created ID and the one-time password are transferred to the home server 200 (S3).

Upon receiving the ID, the home server 200 checks the pointer value P and the one-way function number H[N] and creates a one-time password MK' as explained above. The home server 200 compares the MK and the MK'. When the MK and the MK' match, the home server 200 completes the authentication and informs the control device 100 of the authentication (S4).

Upon the authentication completion, the control device 100 and the home server 200 commence communication according to a protocol (S5). Specifically, application data can be transmitted and received with enhanced security in conformance with an IPsec protocol.

Figure 11:
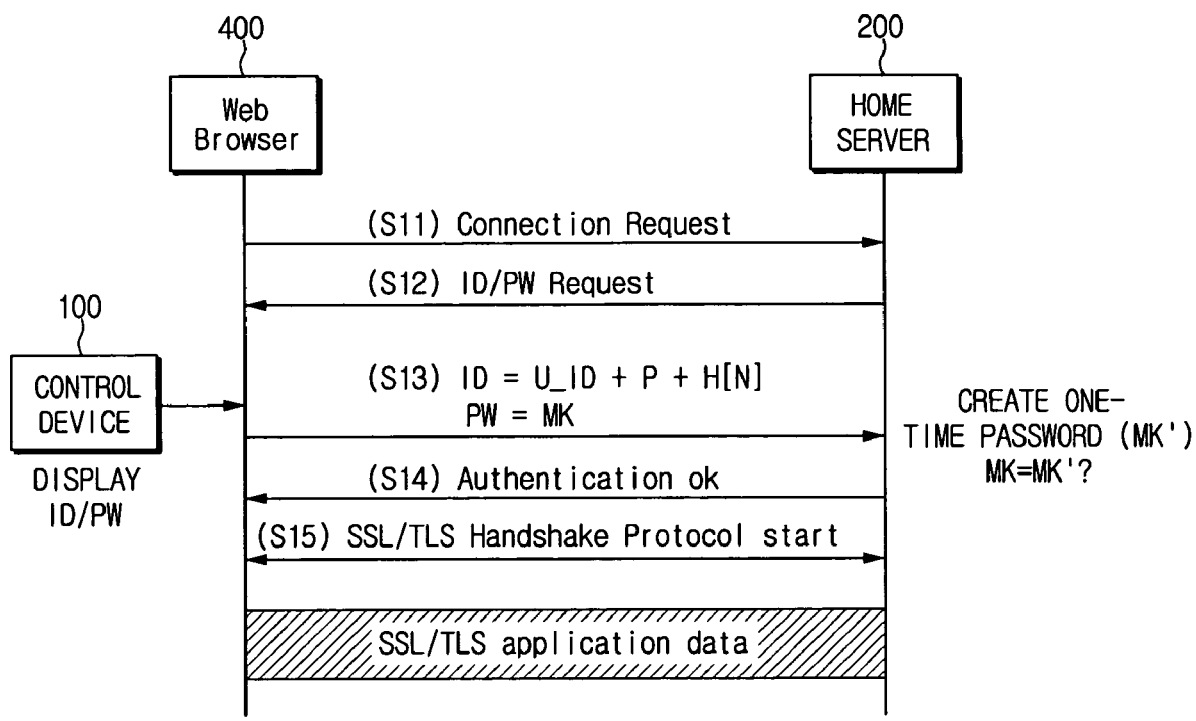

FIG. 11 is a conceptual diagram explaining connection of the home server 200 using a PC 400 instead of the control device 100. Referring to FIG. 11, the connection request is made using the PC 400 which is equipped with a web browser program (S11).

The home server 200 requests the ID and the password (S12). The user confirms the ID and the password through the control device 100 and inputs the confirmed values to the PC 400. The input ID and password is transferred to the home server 200 (S13). In more detail, the control device 100 creates an ID by accumulating the user ID U_ID, the pointer value P, and the one-way function number H[N] in response to the user's request. Additionally, the control device 100 creates a password MK using the current pointer value P, the corresponding specified code value C, and the one-way function. Next, the created ID and password is displayed via a display element provided therein.

The home server 200, upon receiving the ID and the password, creates a one-time password MK' and checks whether MK and MK' match. When the two passwords match, the home server 200 completes the authentication and notifies the PC 400 of the authentication (S14). It can be seen in FIG. 14 that the PC 400 and the home server 200 commence communication according to a SSL/TLS protocol (S15). Thus, the authentication method can be realized with the SSL/TLS protocol supported by the current web browser.

As set forth above, without a token device, the one-time password can be created and used for authentication. Particularly, when the password is created using the code value of the button selected at the control device, and the one-way function, the code value is changed on occasion depending on the use of the control device. Therefore, the one-time password can be created without the separate initialization process, and the security of the home network system can be enhanced.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A control device authentication method in a home network system which comprises a slave, a home server for controlling the slave, and a control device which performs a remote control function to control the home server, the method comprising:

registering the control device to the home server;

generating and storing, by the control device and the home server, a one-way function set having parameters comprising a user identification (ID) of the control device, and an authentication key assigned to the control device;

storing, by the control device and the home server, a code value of a button pressed at the control device which performs the remote control function;

creating, by the control device, a first password by performing an operation using a pointer value, which indicates an area storing the code value in a first memory provided in the control device, the code value, and a one-way function number which is a one-way function among the one-way function set;

requesting, by the control device, the authentication by transferring the pointer value, the one-way function number, and the first password to the home server;

creating, by the home server, a second password by performing an operation using the code value stored in a first server memory in an area indicated by the pointer value transferred from the control device, the pointer value, and a one-way function corresponding to the one-way function number; and completing, by the home server, the authentication of the control device if a determination is made that the first password and the second password match.

2. The control device authentication method of claim 1, wherein the registering of the control device comprises:

transferring, by the control device, a register request packet to the home server;

generating and displaying, by the home server, an authentication key;

transferring, by the control device, byte values of the authentication key to the home server if a user of the control device inputs the authentication key;

generating, by the control device and the home server, the user ID by converting the authentication key; and storing, by the control device and the home server, the generated user ID and the authentication key.

3. The control device authentication method of claim 1, wherein the registering of the control device comprises:

transferring, by the control device, a register request packet to the home server;

generating and transferring, by the home server, an authentication key to the control device;

transferring, by the control device, byte values of the authentication key to the home server if a user of the control device inputs the authentication key;

generating, by the control device and the home server, the user ID by converting the authentication key; and storing, by the control device and the home server, the generated user ID and the authentication key.

4. The control device authentication method of claim 2, wherein the storing of the code value comprises:

performing, by the control device, an operation using the code value, the pointer value, which indicates the area to store the code value in the first memory, and the authentication key, and transferring an operation result to the home server;

checking, by the home server, the code value using the received operation result and the authentication key, and transferring a reply packet;

determining, by the control device, a normal reception of the code value at the home server if the reply packet is received, and storing the code value in the first memory; and storing, by the home server, the checked code value in an area of the first server memory.

5. The control device authentication method of claim 2, wherein the storing of the code value comprises:

performing, by the control device, a first operation using a first value of the authentication key and the code value, and transferring a first operation result to the home server;

performing, by the home server, a second operation using the code value confirmed by the first operation result and a second value of the authentication key, and transferring a second operation result to the control device;

authenticating the code value after the control device checks the code value from the second operation result using the second value of the authentication key;

performing, by the control device, a third operation using the authenticated code value and a third value of the authentication key, and transferring a third operation result to the home server;

checking, authenticating, and storing, by the home server, the code value from the third operation result using the third value of the authentication key;

performing, by the home server, a fourth operation using the authenticated code value and a fourth value of the authentication key, and transferring a fourth operation result to the control device; and checking, by the control device, the fourth operation result using the fourth value of the authentication key, completing the authentication, and storing the code value.

6. The control device authentication method of claim 4, wherein the storing of the code value further comprises:

synchronizing, by the home server and the control device, the pointer value of the first memory and the pointer value of the first server memory; and storing, by the home server, the checked code value in the first server memory which is indicated by the pointer value received from the control device.

7. A control device which controls a home network which comprises a slave and a home server which controls the slave, the device comprising:

an interface which transmits and receives data to and from the home server;

a key input section comprising buttons which control the home server and outputs a code value corresponding to a selected button;

a code value authenticator which transfers the data to the home server and authenticates the code value which is output from the key input section;

a first memory which stores the code value authenticated by the code value authenticator;

a second memory which stores a one-way function set;

a password creator which creates a one-time password using a pointer value indicating an area in the first memory storing a first code value, the code value, and a one-way function selected from the one-way function set; and a controller which generates a packet containing the pointer value, a one-way function number, and the one-time password, and requests authentication by transferring the generated packet to the home server via the interface.

8. The control device of claim 7, wherein the controller, if an authentication key is input through the key input section, generates a user identification (ID) by converting the authentication key and stores the authentication key and the user ID in the second memory.

9. The control device of claim 8, wherein the controller transmits byte values of the authentication key input through the key input section, to the home server via the interface and the home server converts the authentication key to the user ID and registers the user ID.

10. The control device of claim 9, wherein the controller generates a one-way function set including a plurality of one-way functions and stores the one-way function set in the second memory when the registration is completed.

11. The control device of claim 10, wherein the code value authenticator performs an operation with the code value and the authentication key, transmits the operation result to the home server via the interface, and authenticates the code value if a code value, which is recorded in a reply packet received from the home server, matches the code value.

12. A home server which controls a slave under control of a control device in a home network system which comprises the control device and a slave, comprising:
   a server interface which receives from the control device a pointer value indicating an area of a first memory of the control device, a one-way function number, and a first password;
   a first server memory which stores a code value corresponding to a button input at the control device;
   a second server memory which stores a one-way function set;
   a calculator which calculates a second password using the code value stored in an area indicated by the pointer value in the first server memory, the pointer value, and a one-way function which corresponds to the one-way function number in the one-way function set; and
   a home server controller which authenticates the control device if the first password and the second password match.

13. The home server of claim 12, wherein the home server controller synchronizes a first pointer value received from the control device and a second pointer value of the first server memory.

14. The home server of claim 13, further comprising:
   a display section which displays data,
   wherein the home server controller generates an authentication key for the control device if a register request packet is received from the control device, and controls the display section to display the authentication key.

15. The home server of claim 14, wherein the home server controller, if the authentication key is received from the control device, generates a user identification (ID) by converting the received authentication key, generates the one-way function set having parameters comprising the user ID and the authentication key, and stores the user ID, the authentication key, and the one-way function set in the second server memory.

16. The home server of claim 15, further comprising:
   an authenticator which authenticates the code value received from the control device, using the authentication key,
   wherein the home server controller stores the code value authenticated by the authenticator in the first server memory.

* * * * *